Patented Apr. 7, 1931

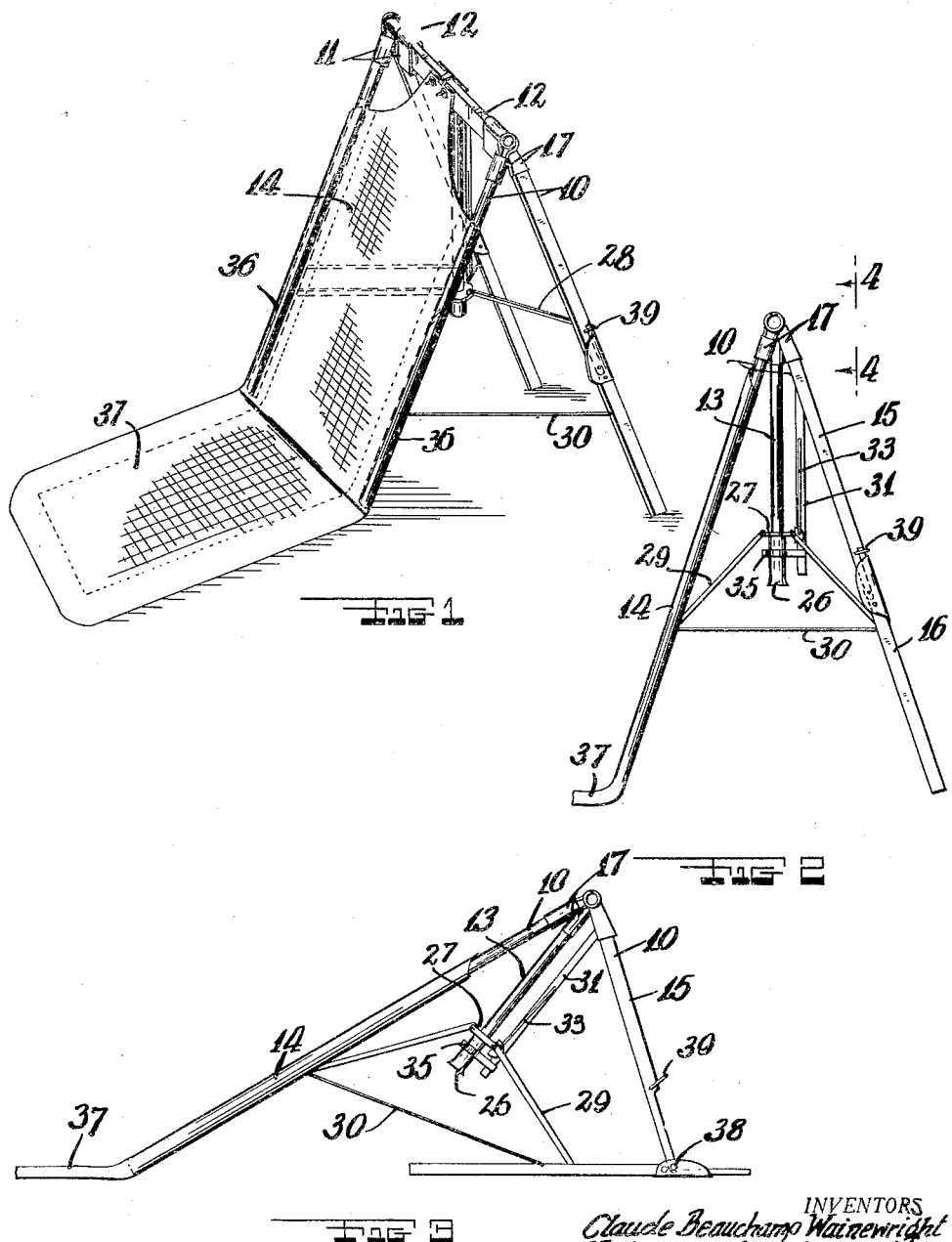

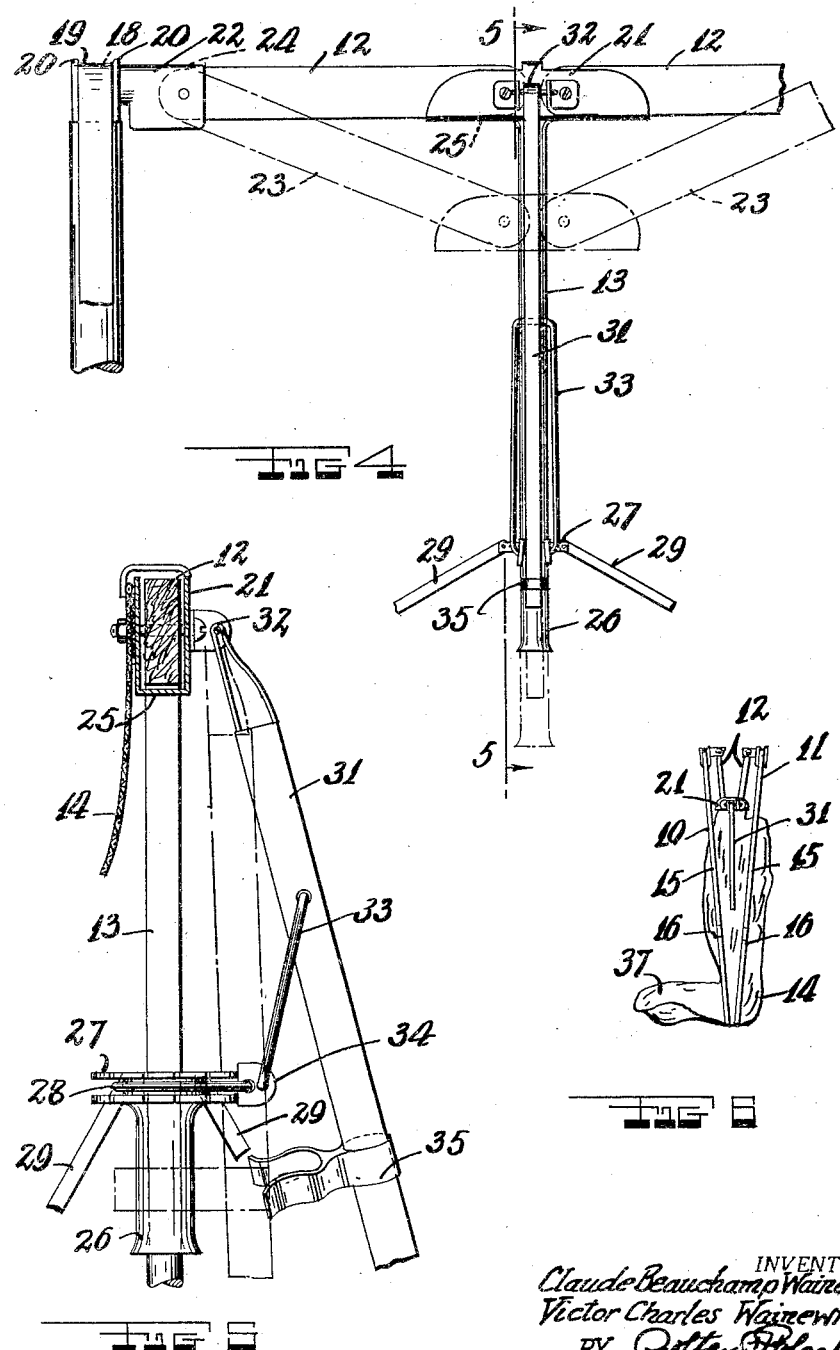

1,799,939

UNITED STATES PATENT OFFICE

CLAUDE BEAUCHAMP WAINEWRIGHT AND VICTOR CHARLES WAINEWRIGHT, OF VANCOUVER, BRITISH COLUMBIA, CANADA

CONVERTIBLE GROUND SEAT AND LOUNGE

Application filed April 11, 1930. Serial No. 443,301.

This invention relates to new and useful improvements in a convertible ground seat and lounge.

The invention has for an object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a device constructed according to this invention.

Fig. 2 is a fragmentary side elevational view of the device shown in Fig. 1.

Fig. 3 is a view similar to Fig. 2, but illustrating the device in another position.

Fig. 4 is an enlarged fragmentary rear elevational view looking in the direction of the lines 4—4 of Fig. 2.

Fig. 5 is a fragmentary vertical sectional view taken on the line 5—5 of Fig. 4.

Fig. 6 is a rear elevational view of the device in a folded condition.

The convertible ground seat and lounge consists of a group of side-forming members 10 hingedly connected at their tops, a second group of side-forming members 11 hingedly connected at their tops, arm sections 12 for holding said groups in spaced positions while in a straight line, means for holding said arm sections against upward motion for maintaining the straight line and for allowing downward motion to collapse them to bring the groups of side-forming members together, a stem 13 depending from said arm sections 12, spreading means slidable on said stem 13 and connected with said side-forming members 10 and 11 to maintain the latter elements spread when at the bottom of said stem, means for raising said stem to hold said arm sections 12 in the straight line and for holding the bottom of the stem adjacent said spreading means, a collapsible seat back 14 on the front side-forming members of said groups, the rear side-forming members of said groups being of upper and lower sections indicated by reference numerals 15 and 16 respectively, and means for holding the top sections 15 in raised or lowered positions.

The group of side-forming members 10 consists of a pair hingedly connected together at their tops 17. The hinged connection consists of a stud 18 engaging thru an eye member 19 on one of the side-forming members 10 and a pair of eye members 20 engaging on the stud and connected with the other of the pair of side-forming members 10. The second group of side-forming members 11 is very similar to the first group, that is, it is composed from a pair of arms pivotally connected at the top by a stud such as 18 engaging thru eye members 19 and 20.

The arm sections 12 consist of a pair in end aligning positions. The inner ends of these arm sections are pivotally connected on a bent plate link member 21 and the outer ends pivotally connected with bent plate supports 22 attached upon the said studs 18. The arm sections hold the groups of side-forming members in spaced positions when in a straight line. When collapsed as indicated by dot and dash lines 23 in Fig. 4, the groups of side-forming members are drawn together. In Fig. 6 the arm sections are shown in their fully collapsed positions.

The means for holding said arm sections against upward motion for maintaining the straight line and for allowing downward motion to collapse them to bring the groups of side-forming members together consists of top portions 24 formed on the bent support plates 22 and extending over the outer ends and the top edges of the arm sections 12. The pivot point of the arm sections on the bent plate supports is so located that each of the arm sections may only pivot downwards and is restrained from moving to a higher position than the horizontal. The bent plate link member 21 is formed with a bottom portion 25 extending under the bottom edges of the inner ends of the arm sections 12 and the pivots of the arm sections upon the link member 21 are so located that the arm sections are restrained from downward motion below the link member, but are free to move upwards above the horizontal. This arrangement provides that the stem 13 may be forced upwards only to such a position where the arm sections are in a straight line. In this position the groups of side-forming members are held in their fully spaced positions. When the stem 13 is drawn downwards, the arm sections may collapse to positions as shown in Fig. 6 and draw the groups of side-forming members together.

The stem 13 is attached upon the bottom portion 25 of the bent link plate member 21. The spreading means upon the stem 13 and connected with said side-forming members 10 and 11 to maintain the latter elements spread when located at the bottom of the stem consists of a collar 26 slidably mounted upon the stem 13 and formed with a head portion 27. This head portion is provided with a groove receiving a ring shaped wire 28. Several radial slots are formed in the head section and the ends of ribs 29 engage into these slots and are pivotally mounted upon the wire 28. There is one rib 29 for each of the side-forming members 10 and 11. The outer ends of the ribs 29 are pivotally secured intermediate the ends of the side-forming members. Flexible members 30 are connected between all of the side-forming members so as to limit the spread position which these members may assume. When the collar 26 is moved downwards upon the stem 13 the ribs 29 move outwards for spreading the side-forming members, and when the collar 26 is moved upwards relative to the stem 13 the side-forming members are drawn together.

The means for raising said stem 13 to hold the arm sections 12 in the straight line and for holding the bottom of the stem adjacent said spreading means consists of an arm 31 pivotally supported at its top 32 upon the side of the bent plate link 21. A link 33 pivotally connects intermediate the ends of the arm 31 at its outer end and at its inner end pivotally connects with a clip 34 attached upon the head 27 of the collar 26. A clip or catch 35 is attached upon the arm 31 and is adapted for engaging the collar 26 so as to maintain a vertical position. In the vertical position the link 33 moves the collar 26 down upon the stem so as to accomplish the spreading before called for. Further, in the vertical position, the arm 31 holds the arm sections 12 in the straight line.

The collapsible seat back 14 consists of a sheet of cloth attached at its side edges 36 onto the front side-forming members of the groups 10 and 11. At the top the cloth is attached upon each of the arm sections 12. This cloth is provided with a bottom extended portion 37 constituting a seat so that one may sit thereon and rest against the seat back. The means for holding the top sections 15 of the rear members of the groups of side-forming members in raised or lowered positions consists in a pivotal connection 38 between the top and bottom sections 15 and 16 and so located that it is disposed at the bottom end of the top section and slightly inwards from the top end of the bottom section. This allows the bottom section to assume a horizontal position resting upon the ground as shown in Fig. 3, or to assume an aligned position with the top section as shown in Fig. 1. A link 39 is pivotally mounted upon the top section and is engageable over the top end of the bottom section as shown in Fig. 1 when these sections are in line so as to clamp them for maintaining their positions.

The device in the position as shown in Fig. 1 is intended as a ground seat. One may sit upon the cloth portion 37 which rests upon the ground and may lean backwards against the seat back portion 14. It is of particular advantage upon the surf or other outing place. If the user so desires, he may turn the bottom sections 16 to the horizontal position and use the device as a lounge.

Any suitable bracket or clamp may be attached to the frame for securing a parasol in position to provide shade. When the device is not used, it may be collapsed to a position as shown in Fig. 6. This collapsing is accomplished by pivoting the arm 31 outwards so that the clip 35 releases the collar 26. Then the arm 31 and the stem 13 may be drawn downwards relative to the collar 26 so that the collar moves upwards upon the stem 13. Relative upward motion of the collar upon the stem causes the ribs 29 to move out of their spreading position and causes the arm sections 12 to assume their collapsed positions. Attention is called that as the collar 26 moves upwards upon the stem 13, the arm 31 is first forced outwards but after the collar has passed the pivot point of the outer end of the link 33 the arm 31 is drawn inwards to a vertical position. The cloth material may next be wound around the various rigid members and the device stored or carried in this fashion.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A convertible ground seat and lounge, comprising a group of side-forming members hingedly connected at their tops, a second group of side-forming members hingedly connected at their tops, arm sections for holding said groups in spaced position while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, means for raising said stem to hold said arm sections in the straight line and for holding the bottom of the stem adjacent said spreading means, a collapsible seat back on the front side-forming members of said groups, the rear side-forming members of said groups being of upper and lower sections, and means for holding the top sections in raised or lowered positions.

2. A convertible ground seat and lounge, comprising a group of side-forming members hingedly connected at their tops, a second group of side-forming members hingedly connected at their tops, arm sections for holding said groups in spaced positions while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, means for raising said stem to hold said arm sections in the straight line and for holding the bottom of the stem adjacent said spreading means, a collapsible seat back on the front side-forming members of said groups, the rear side-forming members of said groups being of upper and lower sections, and means for holding the top sections in raised or lowered positions, said arm sections being two in number and pivotally connected at their inner ends upon a link member and pivotally connected at their outer ends upon support members provided with studs upon which the top ends of the side-forming members are hingedly connected.

3. A convertible ground seat and lounge, comprising a group of side-forming members hingedly connected at their tops, a second group of side-forming members hingedly connected at their tops, arm sections for holding said groups in spaced positions while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, means for raising said stem to hold said arm sections in the straight line and for holding the bottom of the stem adjacent said spreading means, a collapsible seat back on the front side-forming members of said groups, the rear side-forming members of said groups being of upper and lower sections, and means for holding the top sections in raised or lowered positions, the means for holding said arm sections against upward motion for maintaining the straight line and for allowing downward motion to collapse them to bring the groups of side-forming members together consisting of a bent plate link member pivotally supporting the inner ends of the arms and formed with a bottom portion engaging against the bottom edges of the arm sections when the arm sections are in the horizontal to allow only upward pivoting of the arms, and support members pivotally supporting the outer ends of the arms and formed with top portions engaging against the top edges of the arm sections when in the horizontal so as to permit downward pivoting of the arm sections only.

4. In a convertible ground seat and lounge, a group of side-forming members hingedly connected at their tops, a second group of side-forming members hingedly connected at their tops, arm sections for holding said groups in spaced positions while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, and means for raising said stem to hold said arm sections in the straight line and for holding the bottom of the stem adjacent said spreading means.

5. In a convertible ground seat and lounge, a group of side-forming members hingedly connected at their tops, a second group of side-forming members hingedly connected at their tops, arm sections for holding said groups in spaced positions while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, and means for raising said stem to hold said arm sections in the straight line and for holding the bottom of the stem adjacent said spreading means, said spreading means consisting of a collar slidably mounted upon said stem and formed with a head portion having a groove holding a ring of wire, rib members pivotally supported upon said ring of wire at their inner ends and pivotally connected at their outer ends intermediate the ends of said side-forming members, and flexible members connected between all of the side-forming members for limiting their spread.

6. In a convertible ground seat and lounge, a group of side-forming members hingedly connected at their tops, a second group of side-forming members hingedly connected at their tops, arm sections for holding said groups in spaced positions while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, and means for raising said stem to hold said arm sections in the straight line and for holding the bottom of the stem adjacent said spreading means, comprising an arm pivotally connected at its top upon said arm sections, a link pivotally connected at its outer end intermediate the ends of said arm, the inner end of said link being pivotally connected with said spreading means, and a clip on the bottom of said arm adapted for engaging the spreading means to hold the spreading means spaced from said arm sections.

7. A convertible ground seat and lounge, comprising a group of side-forming members hingedly connected at their tops, a second group of side-forming members hingedly connected at their tops, arm sections for holding said groups in spaced position while in a straight line, means for holding said sections against upward motion for maintaining the straight line and for allowing downward motion to collapse them to bring the groups of side-forming members together, a stem depending from said arm sections, spreading means slidable on said stem and connected with said side-forming members to maintain the latter elements spread when at the bottom of said stem, means for raising said stem to hold said arm sections in the straight line and for holding the bottom of the stem adjacent said spreading means, a collapsible seat back on the front side-forming members of said group, the rear side-forming members of said groups being of upper and lower sections, and means for holding the top sections in raised or lowered positions, comprising a pivotal connection between each of the upper and lower sections of the rear side-forming members, said pivotal connection being at the lower extremity of each top section and slightly positioned inwards from the upper extremity of each bottom section, and a clip mounted upon each top section and engageable with the bottom section to hold the sections aligned.

In testimony whereof we have affixed our signatures.

CLAUDE BEAUCHAMP WAINEWRIGHT.
VICTOR CHARLES WAINEWRIGHT.